Sept. 22, 1970  D. A. GALONSKA ET AL  3,529,486
BALL DEFLECTOR FOR BALL SCREW AND NUT DEVICES
Filed Sept. 4, 1968

INVENTORS
David A. Galonska, &
Lowell F. Smith

D. L. Ellis
ATTORNEY

United States Patent Office 3,529,486
Patented Sept. 22, 1970

3,529,486
BALL DEFLECTOR FOR BALL SCREW
AND NUT DEVICES
David A. Galonska and Lowell F. Smith, Saginaw, Mich.,
assignors to General Motors Corporation, Detroit,
Mich., a corporation of Delaware
Filed Sept. 4, 1968, Ser. No. 757,400
Int. Cl. F16h 55/18, 55/12
U.S. Cl. 74—459                                6 Claims

ABSTRACT OF THE DISCLOSURE

In a recirculating ball screw and nut device including one or more endless trains of bearing balls circulable through cooperating helical grooves in the screw and nut and a transfer tube in the nut, a ball deflector includes a rod-like deflector element seated firmly in the groove of the screw under the bias of a coil compression spring within a retaining element fixed within the nut and having a key end thereof received within a keyway of the deflector element and operative to restrain the latter against rotation with the screw relative to the nut but permit axial displacement relative thereto with axial endwise movement of the screw arising from axial lash in the recirculating ball connection.

---

This invention relates to recirculating ball screw and nut devices and more particularly to an improved ball deflector construction for such devices.

The Means, Jr., U.S. Pat. 2,505,131 issued Apr. 25, 1950, discloses a type of ball deflector construction for recirculating ball screw and nut devices in which a rod like deflector portion is contained directly within the mating helical grooves of the screw and nut and provided with beveled ends engageable by the circulating train of bearing balls passing through the grooves so that the balls are deflected to travel through passages in the nut and a transfer tube thereon which complete the closed circuit or passage for such balls.

The present invention provides improvement in this type of ball deflector construction, particularly in the provision of a deflector element which may be seated closely and firmly against the screw groove for maximum efficiency of the beveled pickup or reflector ends of the deflector element in being smoothly engaged by the circulating train of balls in the screw groove for deflection thereof into the nut passages and transfer tube or other return means. A further feature of this invention is in the provision of a rod like deflector element seated in the screw groove, a retaining element mounted to the nut, and a connection between such elements holding the deflector element against relative rotation with the screw with respect to the nut but allowing it to displace axially with the screw relative to the nut as might arise during any appreciable lash in the recirculating ball connection of the screw and nut device. A further feature of the invention is in the provision of biasing means on the nut operative to urge the deflector element into closely seated relation in the screw groove without significant impairment of the ability of the deflector element to displace axially with the screw relative to the nut. Yet another feature of the invention is in the provision of a ball deflector construction embracing the above enumerated features but further constructed with a retaining element in the nut adapted to act as a fastener for the exteriorly mounted transfer tube and clamp assembly of the nut.

These and other features and advantages of the invention will be readily apparent from the following specification and from the drawings wherein.

Figure 1:
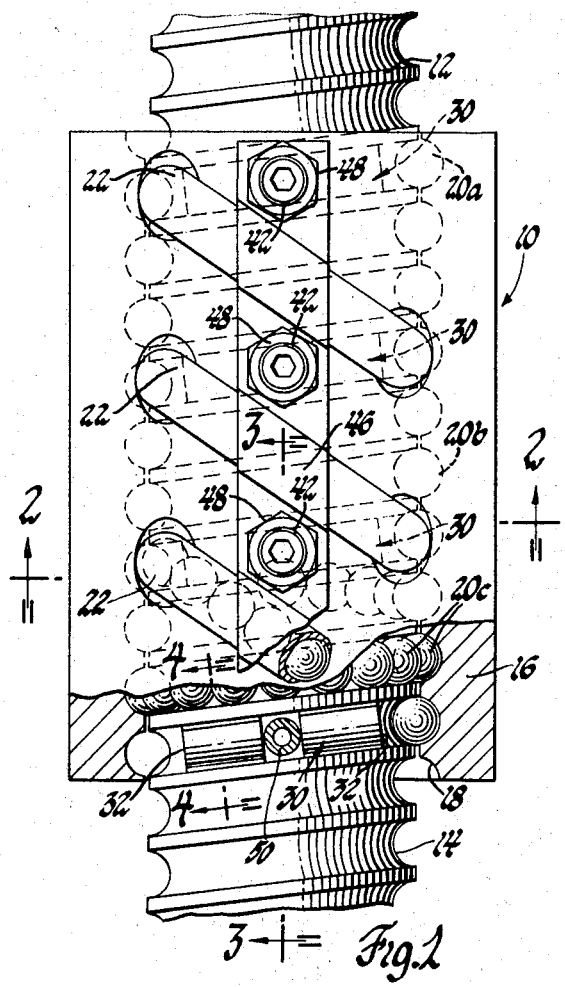
FIG. 1 is an elevational view of a ball screw and nut device partially broken away to illustrate ball deflector construction according to this invention.

Referring particularly to FIG. 1 of the drawings, a ball screw and nut device designated generally as 10 includes a screw 12 provided with a ball groove 14, the screw 12 being received within the bore of a nut 16 provided with an internal helical groove 18 of identical lead with that of the screw groove 14 and cooperable with the latter to form one or more closed bearing ball loops or passages. As presently disclosed, three such passages are provided each for one of three groups of bearing balls 20a, 20b and 20c which provide operative connection between the screw 12 and nut 16 in well-known manner. Each group of bearing balls is adapted to circulate as an endless train through the cooperating closed loop grooves of the screw and nut. To provide the closed loop for passage of each ball group between one convolution of groove in the nut and a spaced such convolution a transfer tube 22 is provided therebetween exteriorly of the nut and including end portions 24 received within generally radial bores 26 in the nut located at the respective end convolutions of groove 18 or helical passage partially defined thereby. Rather than the specific transfer tubes 22, other similar known ball return means may be used with deflector construction of this invention, now to be described.

A successful type of deflector construction for deflecting the bearing balls into either end of the transfer tube or like means and out of the other end thereof is disclosed in the Means, Jr., Pat. 2,505,131. In this prior construction, integral deflector and stem portions of a generally T-shaped deflector member are arranged for reception of the retaining stem portion within a radial bore of the nut, with such retaining portion including an exterior threaded end receiving a nut fastener for holding the member to the ball nut and for drawing the other rod-like deflector portion thereof, which is located directly within the ball passage, snugly into seated engagement within the nut groove. With this construction, it has been found necessary to form and size the deflector portion with sufficient clearance from the sides of the mating groove of the screw as to allow for some normal amount of axial and radial movement or lash in the screw relative to the nut without binding of the screw upon the deflector member. It has been found however that in necessarily accommodating such lash in this way, the action of the deflector is compromised in that this required clearance of the deflector portion locating it away from close proximity to the screw groove inhibits maximum efficiency or smoothness of pickup of the circulating balls intercepting the beveled deflector ends of the deflector portion.

Figure 2:
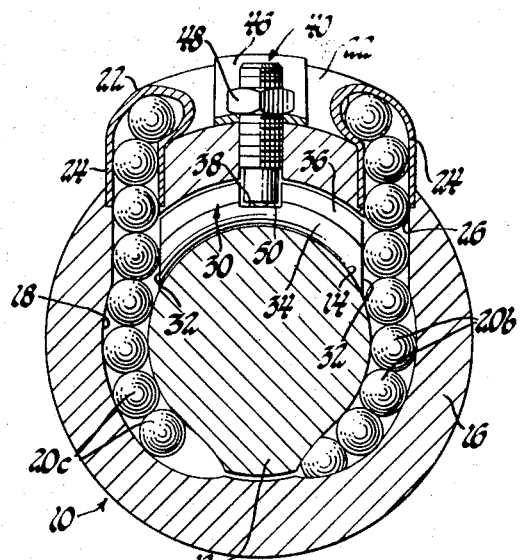
FIG. 2 is a sectional view taken generally along the plane indicated by lines 2—2 of FIG. 1.
Figure 3:
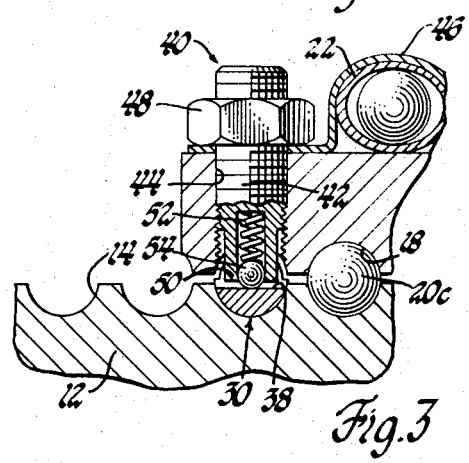
FIG. 3 is an enlarged fragmentary sectional view taken generally along the plane indicated by lines 3—3 of FIG. 1.
Figure 4:
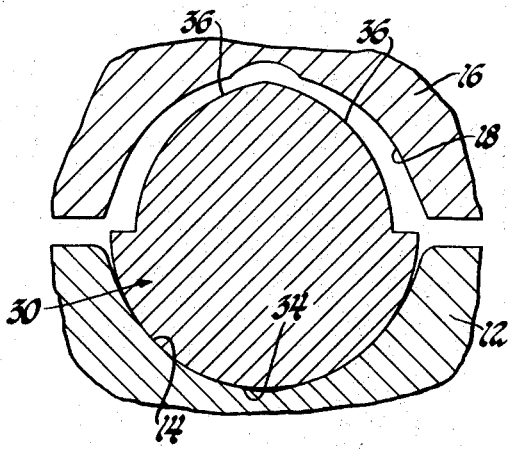
FIG. 4 is an enlarged sectional view taken generally along the plane indicated by lines 4—4 of FIG. 1.
Figure 5:
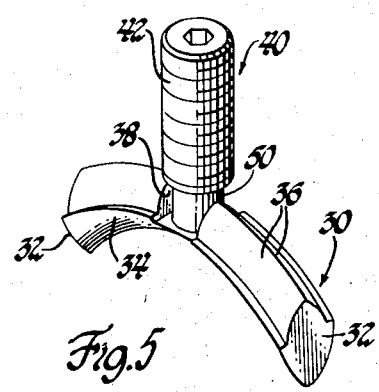
FIG. 5 is a perspective view.

The present invention answers to such difficulties and, as shown in FIG. 5, provides ball deflector construction including a distinct or separate deflector element 30 similar to that of the Means patent in being of rod-like configuration and of a length corresponding to the chordal dimension between the adjacent ends of different transfer tubes 22 as generally indicated in FIGS. 1 and 2. The deflector element is provided with beveled ends 32 each operative in relation to the adjacent bore 26 and end portion 24 of a respective transfer tube. With respect to the three separate ball grooves 20a, 20b and 20c, it is seen that four such deflector elements 30 are required, the two endmost elements each having one end operative with respect to one end of the adjacent transfer tube 22, while the two intermediate deflector elements each have both ends serving a respective end of one of the three transfer tubes. Each deflector element 30 includes a radially inner partial toric surface 34, seen best in FIG. 4, shaped and sized for full seating engagement in the screw groove 14, and a pair of partial toric surfaces 36 configured for normal substantial clearance from the juxtaposed sides of the groove of nut 16. A keyway 38 is formed in the deflector element along planes extending generally transversely thereof for generally parallel axial association with the axis of screw 12.

For each deflector element 30, there is provided a retaining element 40 including a threaded portion 42 mounted within a similarly threaded bore 44 of nut 16 located in an axial plane of nut 16 centrally between the ends of the transfer tubes 22. A clamp strap 46 for holding the various transfer tubes 22 to the nut 16 has apertures each received over the exteriorly exposed ends of a retaining element 40, and nuts 48 are threaded over such ends to fasten the strap. Each retaining element 40 further includes an inwardly projecting end 50 formed generally cylindrical and sized to be received closely between the juxtaposed faces of the keyway 38 of the respective deflector element 30 so that the end 50 acts as a key restraining any substantial rotation of such deflector element with screw 12 relative to the nut during relative motion obtaining during operation of the device. It is however seen that the key and keyway arrangement between end 50 and the deflector element permits axial displacement of the latter with the screw 12 under axial or endwise movement thereof relative to the nut as obtains under any normal lash conditions which may develop with wear of the screw and nut grooves or of the bearing balls during use. Such relative axial movement is of course restricted to the amount of clearance provided between the surfaces 36 of the deflector element and the opposing faces of the nut groove 16, and accordingly such clearance is selected for the expected amount of permissible axial lash during use. Predetermined radial clearance is also provided between the extremity of end 50 and the bottom of the keyway 38 whereby the deflector construction may accommodate a degree of radial lash in the screw and nut devices.

To insure full seating engagement of the surface 34 of the deflector elements with the screw groove 12 and close proximity of beveled ends 32 thereto for maximum efficiency of ball pickup, biasing means are provided between the retaining and deflector elements 30 and 40 such as a coil spring 52 seated at one end within a central bore of the end 50 of the retaining element and seated at its other end on a ball 54 between the spring and the bottom of keyway 38. The spring provides for firm seating engagement of the deflector element in groove 14 of the screw, but the limited contact between the ball 54 and such deflector element presents no appreciable resistance in the retaining element to any axial endwise displacement of the deflector element which may arise during axial lash in the recirculating ball connections.

Thus, it is seen that due to the location of each deflector element 30 in seated engagement within the screw groove, the beveled ends 32 are disposed for optimum performance in engaging and deflecting each successive bearing ball traversing the screw groove passage smoothly into the nut and transfer tube. Further, this optimum performance obtains even during significant axial and radial las hin the screw and nut assembly through the ability of the deflector element to displace with the screw and yet retain their seated engagement thereto.

Having thus described the invention, what is claimed is:

1. In a ball deflector for a recirculating ball screw and nut device and being of the type including an arcuate rod-like deflector portion adapted to be located in a portion of a helical ball passage formed by cooperating grooves in the screw and in the nut, and a stem portion adapted for attachment to the nut and operative to hold the deflector portion to the nut, the improvement comprising, said deflector portion being a distinct part separate from said stem portion, said portions having a connection operative to prevent relative rotation of the deflector portion with the screw about the axis of the latter with respect to the nut yet allow displacement of the deflector portion with the screw under axial endwise movement of the latter relative to the nut and stem portion as arises with axial lash in the recirculating ball connection of the screw and nut device.

2. In a ball deflector for a recirculating ball screw and nut device and being of the type including an arcuate rod like deflector portion adapted to be located in a portion of a helical ball passage formed by cooperating grooves in the screw and in the nut, and a stem portion adapted for attachment to the nut and operative to hold the deflector portion to the nut, the improvement comprising, said deflector portion being a distinct part separate from said stem portion, said portions having a connection including biasing means operative to urge said deflector portion radially inwardly from said stem portion and the nut into seating engagement within the groove of the screw.

3. The improvement recited in claim 1 wherein said connection includes a keyway formed in said deflector portion along planes extending generally transversely thereof and a terminal end of said stem portion adapted to project internally of the nut and into said keyway.

4. The improvement recited in claim 2 wherein said biasing means includes a coil spring seated within a bore of said stem portion and ball means engaged by said spring against the deflector portion.

5. In a recirculating ball nut and screw device including a helically grooved screw located within an outer nut internally grooved with like helix and connected with the screw by an endless train of bearing balls circulable through the cooperating grooves of the screw and nut and through a transfer tube on the exterior of said nut, ball deflector construction comprising, a bolt-like retaining element threadedly connected within a radial bore of the nut and including one end portion projecting internally within a groove convolution thereof, said end portion including a central bore, coil spring means received within said bore, said retaining element further including an opposite threaded end portion projecting exteriorly of the nut, threaded fastener means on said opposite end portion and operative to hold said transfer tube on the nut, a deflector portion of elongated rod-like configuration received in said convolution of the nut and the groove of the screw, said deflector element including a radially inner surface formed for seating engagement within the groove of the screw against movement axially thereof and a radially outer surface juxtaposed to said nut groove convolution with substantial clearance therefrom, a keyway formed within said deflector portion extending generally parallel the axis of the screw and receiving said one end portion of said retaining element as a key therein, said key and keyway connection preventing relative rotation of said deflector portion with the screw about the axis of the latter with respect to the nut yet allowing displacement of the deflector portion with the screw under axial endwise movement of the latter relative to the nut as arises with axial lash in said recirculating ball connection within the limits of said clearance, and ball means intermediate said coil spring and said deflector element urged by said spring against said deflector element for seating engagement of the latter within the groove of the screw.

6. In a recirculating ball screw and nut device including a helically grooved screw located within a ball nut including a groove of like helix and connected with the screw by an endless train of bearing balls, ball deflector construction comprising, a rod-like deflector member configured to be located within a portion of a convolution of the groove of the nut and within the groove of the screw and including a beveled end portion engageable by said train of balls for deflection to within the nut, means on the nut holding said deflector member against relative rotation with the screw about the axis of the latter with respect to the nut yet allowing displacement of said deflector member with the screw under axial endwise movement of the latter relative to the nut as arises with axial lash in said recirculating ball connection, and means biasing said deflector member radially inwardly from the nut into seating engagement within the groove of the screw against movement of said deflector member relative to the screw axially thereof.

References Cited
UNITED STATES PATENTS

| | | | |
|---|---|---|---|
| 2,636,397 | 4/1953 | Jacubenta | 74—459 |
| 2,945,392 | 7/1960 | Folkerts | 74—459 |

LEONARD H. GERLIN, Primary Examiner

U.S. Cl. X.R.
74—441